May 23, 1967 A. M. MOONEY 3,320,785
MACHINE FOR FORMING HELICALLY FLUTED ROD-LIKE ARTICLES
Filed April 29, 1964
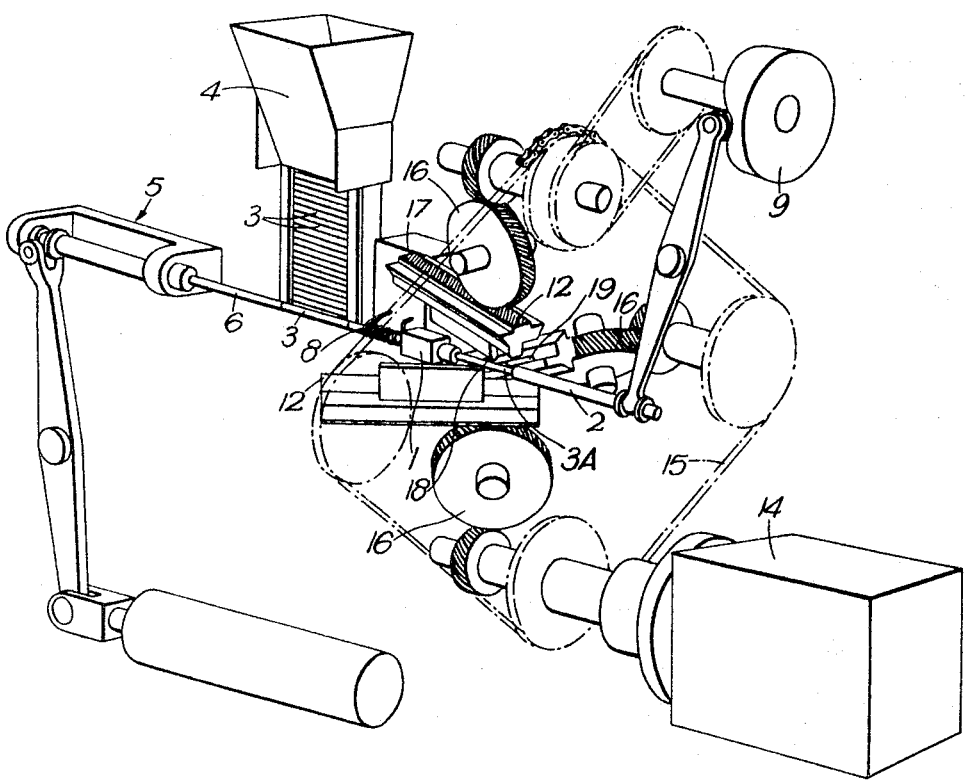
Inventor
Alan Manson Mooney

United States Patent Office 3,320,785
Patented May 23, 1967

3,320,785
MACHINE FOR FORMING HELICALLY FLUTED ROD-LIKE ARTICLES
Alan Manson Mooney, Kiveton Park, England, assignor, by mesne assignments, to Arnold Gascoigne, Sheffield, England
Filed Apr. 29, 1964, Ser. No. 363,543
Claims priority, application Great Britain, May 2, 1963, 17,431/63
7 Claims. (Cl. 72—95)

This invention relates to a method and a machine for forming helically fluted cutting tools (e.g. twist drills) or similar helically fluted rod-like articles from a blank rod, or rods.

The invention provides a machine for use in forming helically fluted cutting tools or like helically fluted rod-like articles from a blank rod or rods which comprises guide and support means for the blank, forming bars lying in planes parallel to the axis of the supported blank and with their lengths lying oblique or askew to the axis, said bars as viewed along the axis co-operating to form a flute forming die-ring in a plane perpendicular to the axis, and means for advancing the bars lengthwise in pressure engagement with the blank to form flutes therein, to advance, or assist in advancing, the blank axially and to rotate the blank.

It is preferred that the cross-sections of the bars are such that they provide surfaces which together form and maintain the die ring during lengthwise advancement of the bars, each said surface being of non-reentrant form so that it can disengage from the formed blank as the blank rotates.

It is also preferred that all the bars lie at the same angle of obliquity to the axis of the blank.

It is further preferred that means is provided for reciprocating the bars lengthwise, the return strokes being idle.

In one form of the machine the planes aforesaid are equi-distant from the axis of the blank and form, as viewed along the axis, a regular polygon (e.g. an equilateral triangle, a square or a regular pentagon).

Preferably the bars are carried by slides for movement as aforesaid, the slides lying in planes which are parallel to and equi-distant from the centre line of the blank, the planes forming a regular figure, as viewed along the axis of the supported blank.

When the invention is applied to the formation of twist drills, there may be four bars lying in planes which form a square, a pair of opposed bars providing surfaces shaped to form the flutes and the other pair of surfaces shaped to form the lands and body clearances.

The invention also provides a method of forming helically fluted cutting tools or similar helically fluted rod-like articles from a blank rod or rods comprising feeding the rod blank lengthwise through a flute forming die ring, the ring being built up of separate elements each of bar-form with its length lying in a plane parallel to the axis of the blank and lying oblique or askew to that axis, the cross-sections of the bars being such that they provide surfaces which together form and maintain the die ring during lengthwise advancement of the bars, and advancing the bars lengthwise in pressure contact with the blank to feed and rotate the blank and in so doing also to form flutes in the blank.

It is preferred that the bars are given lengthwise reciprocating movements, the return strokes being idle.

By way of example, a specific embodiment of a twist-drill making machine and its method of operation, in accordance with the invention, will now be described with reference to the accompanying drawing which is a diagrammatic perspective view of the machine.

The machine comprises two bushes 1 and 2 which support each blank in turn and fix the axis thereof and also the axis of the machine. The bush 1 is fixed and blanks 3 are fed in succession axially into this bush from a hopper 4 by means of a pusher device 5, 6. The bush 1 is associated with an induction heating coil 8 by which the portion of the blank which is to form the body of the drill is heated to forging temperature, the portions of the blank within the bush remaining cool and being intended to form the drill shank. When heated, the blank is pushed through bush 1 until, as seen at 3A, its cool end enters bush 2. The bush 2 acts as a stop and is movable, by a cam 9, with the blank as it is formed and advanced.

In each of four planes equi-distant from the axis of the machine and parallel thereto—the planes forming a square as viewed along the axis—there is a fixed guide plate (not shown) in which slides a dove-tail carrier 12 (only three are shown). The carriers are slidable along lines which are oblique to the axis of the blank, all in the same sense and all at the same angle which, measured in the planes, is the desired helix angle for the flutes. The carriers are arranged for reciprocation in synchronisation by means of a motor 14, chain 15, gears 16 and rack 17. Attached to each carrier there is a bar-like forming tool 18, 19, with its length in the direction of reciprocation. One opposed pair of these tools are shaped to form the flutes and the other pair to form the lands and body clearance. Each bar is formed at its leading end to provide a smooth run-out of the flutes and body clearance in the finished drill. The bars are so shaped that they form, as viewed along the axis of the blank, and at the operating station, a closed die ring of a form necessary to develop the desired cross-section of the drill.

In operation of the machine, the heated blank is fed between the bushes, the carriers being fully withdrawn clear of the path of the blank. The carriers are then advanced so that the forming bars grip the blank simultaneously at the operating station or zone of maximum deformation. As they they continue to advance the bars effect plastic deformation of the blank to the required shape and at the same time rotate and advance the blank. The portion of the blank initially ahead of the operating zone is undeformed and provides the shank of the drill. When deformation has been completed the bars are returned for the next operation.

It is to be understood that the invention is not restricted to the use of four carriers and bars. There may be different numbers suited to forming fluted articles of varying cross-sections.

I claim:

1. A machine for forming flutes in a rod blank and comprising means for supporting and guiding the blank for lengthwise movement in the axial direction of the blank, a plurality of forming bars, means for supporting and guiding the bars for rectilinear lengthwise movement of the bars in planes parallel to the said direction of movement with their lengths oblique to said direction, said bars co-operating to form a flute forming die-ring perpendicular to said direction and around the axis of the supported blank, and means for advancing the bars in the lengthwise directions thereof in pressure engagement with the blank to form flutes in the blank to effect lengthwise movement of the blank through the said die-ring and to rotate the blank.

2. A machine as claimed in claim 1 in which all the bars lie at the same angle of obliquity to the axis of the blank.

3. A machine as claimed in claim 1 which includes means for reciprocating the bars lengthwise, the return strokes of the bars being idle.

4. A machine as claimed in claim 1 in which the planes aforesaid are equi-distant from the axis of the blank and form, as viewed along the axis, a regular polygon.

5. A machine as claimed in claim 1, in which the means for supporting and guiding the bars are slides lying in planes which are parallel to and equi-distant from the centre line of the blank, the planes forming a regular polygon, as viewed along the axis of the supported blank.

6. A machine for forming a twist drill from a rod blank consisting of means engaging the ends of the blank for supporting and guiding the blank for lengthwise movement in the axial direction of the blank, four slides in four planes parallel to said direction of movement of the blank said planes being equi-distant from the axis of the blank and forming, as viewed along the axis, a square and said slides being movable in said planes in directions equally oblique to the blank axis, means for effecting simultaneous reciprocation of the slides in said directions, and four forming bars carried by the four slides respectively with their lengths parallel to the directions of slide movements, the bars together forming a flute forming die-ring around the axis of the blank and perpendicular thereto and making pressure engagement with the blank, one pair of opposed bars being shaped to form flutes in the blank and the other pair being shaped to form lands and body clearances on the blank as the bars are advanced by the slides.

7. A machine as claimed in claim 6 in which the means for supporting and guiding the blank comprise a stop for the leading end of the blank and means for progressively withdrawing the stop in timed relation with the advance of the bars by the slides.

References Cited by the Examiner

UNITED STATES PATENTS

| | | | |
|---|---|---|---|
| 245,756 | 8/1881 | Webb | 72—95 |
| 2,901,932 | 9/1959 | Erdelyi | 72—64 |
| 2,985,041 | 5/1961 | Hayden | 72—64 |

CHARLES W. LANHAM, *Primary Examiner.*

L. A. LARSON, *Assistant Examiner.*